Jan. 10, 1967 H. C. HANSEN 3,297,327

CYCLE CONTROL PHONOGRAPHS

Filed Aug. 12, 1963 2 Sheets-Sheet 1

INVENTOR.
HANS CHRISTIAN HANSEN
BY
Dicke & Craig
ATTORNEYS

Jan. 10, 1967 H. C. HANSEN 3,297,327

CYCLE CONTROL PHONOGRAPHS

Filed Aug. 12, 1963 2 Sheets-Sheet 2

INVENTOR.
HANS CHRISTIAN HANSEN
BY Dicke & Craig
ATTORNEYS

United States Patent Office 3,297,327
Patented Jan. 10, 1967

3,297,327
CYCLE CONTROL PHONOGRAPHS

Hans Christian Hansen, 14 Christiansholmsvej, Copenhagen, Denmark
Filed Aug. 12, 1963, Ser. No. 301,451
Claims priority, application Great Britain, Aug. 10, 1962, 30,713/62; Sept. 10, 1962, 34,578/62
12 Claims. (Cl. 274—10)

The present invention relates to cycle control phonographs.

It is a general purpose of the invention to provide a cycle control phonograph having a turntable adapted to be driven at a plurality of different speeds and a change cycle mechanism in which the cycle time is constant, independent of the selected turntable speed.

A further purpose of the invention is to provide a phonograph having a cycle control mechanism in which the drive for the cycle control mechanism is derived directly from the phonograph motor and which is simple in construction and reliable in operation.

Figure 1:
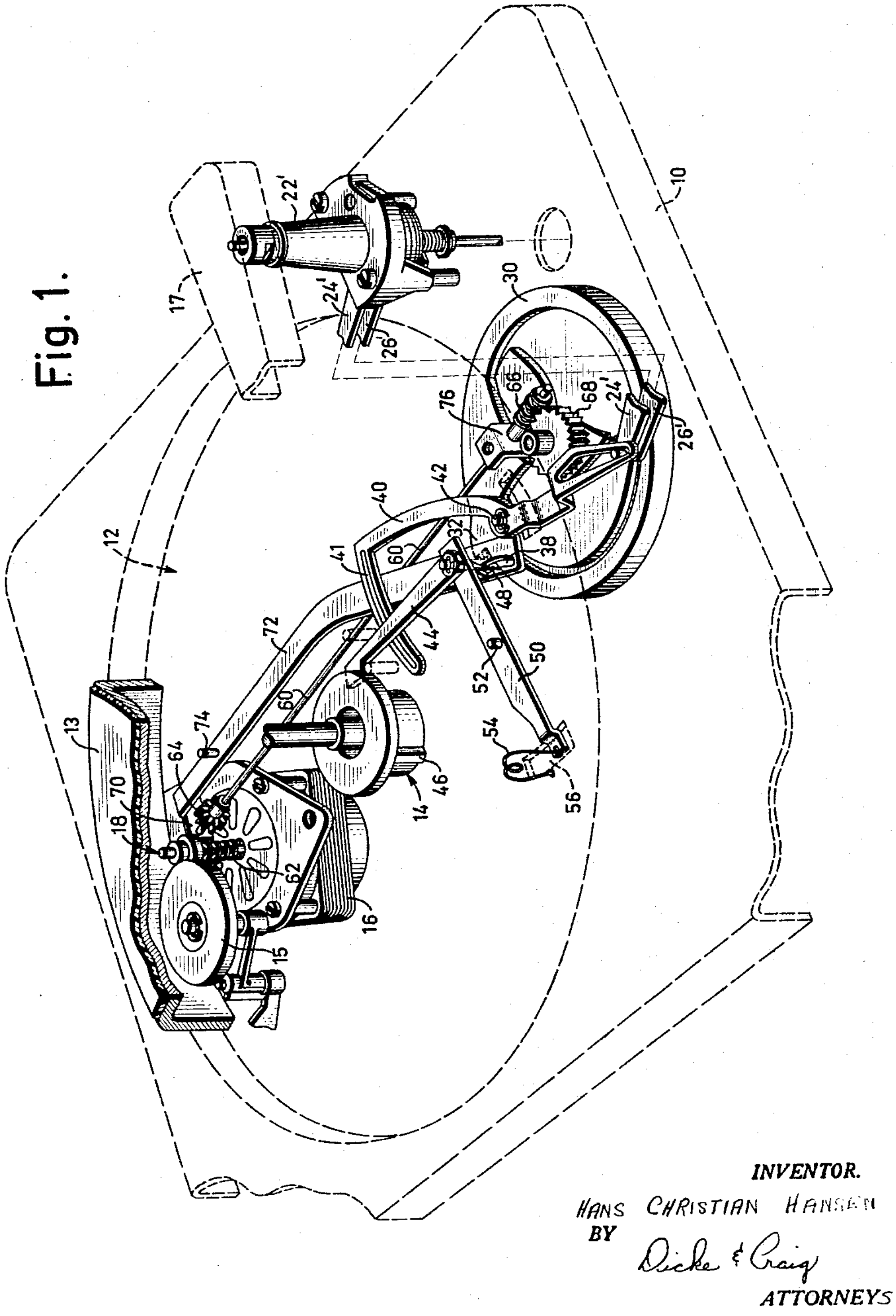
Figure 2:
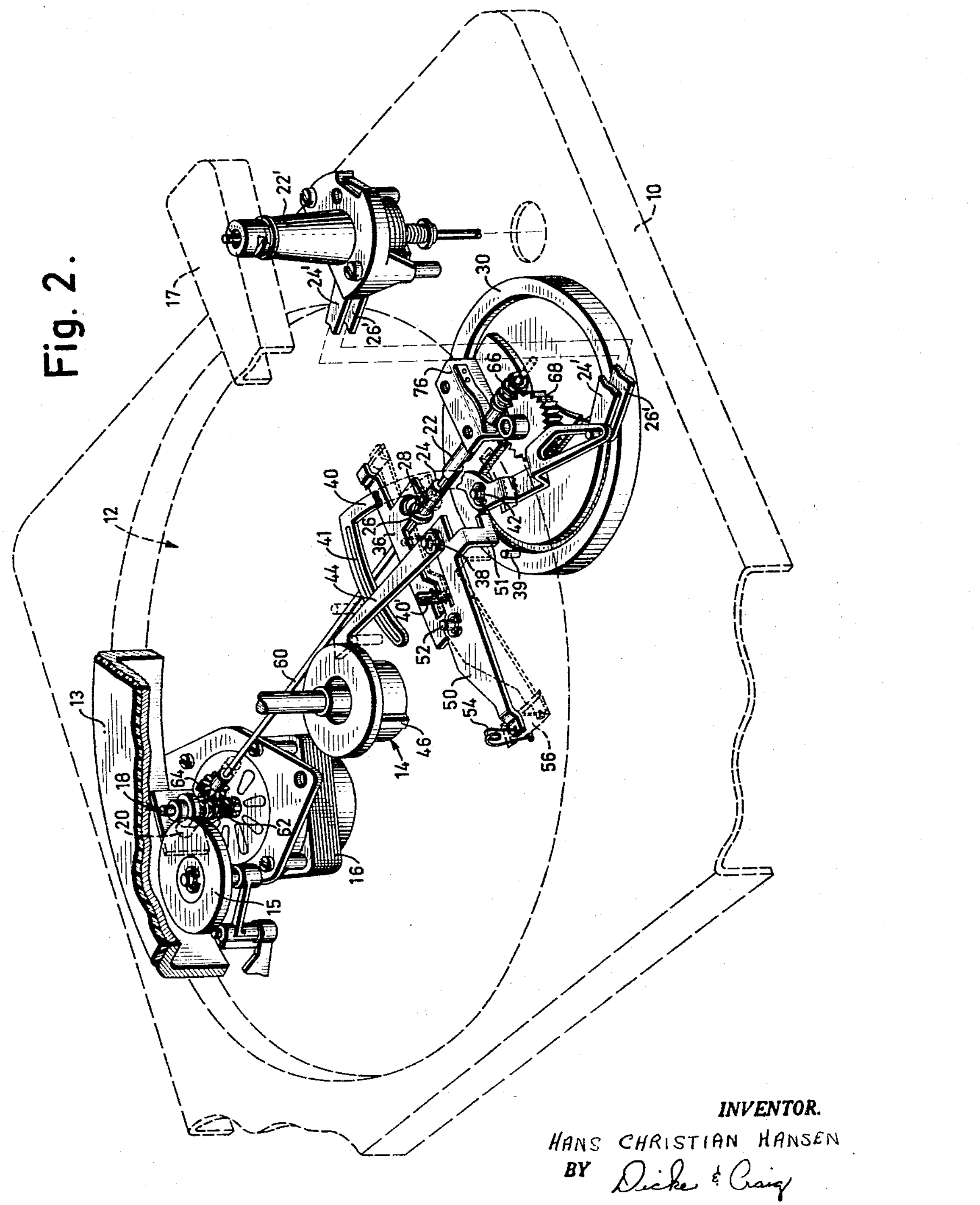

Still further purposes and advantages of the invention will appear from the following specification with reference to the accompanying drawing, in which FIGURE 1 is a perspective view of those parts of a phonograph according to the invention which are necessary for the understanding of the features of the invention in one embodiment, and FIGURE 2 is a similar perspective view showing the parts of a phonograph in another embodiment.

The phonograph illustrated in FIGURE 1 comprises a chassis plate 10 which has a central depression 12 for receiving a turntable a part of which is shown at 13 and which is mounted on a rotatable turntable bushing 14.

Below the chassis plate 10 a phonograph motor 16 is supported provided with a motor spindle which has a stepped pulley 18 for driving the turntable at a plurality of selectable speeds through an idler gear wheel 15.

The phonograph further includes a tone arm adapted to carry stylus means, the rear end only of which is shown at 17 and which is movable between a position after termination of the playing of a record to a start-of-play position by means of a cycle control mechanism.

The mechanism which is adapted to control the phonograph cycle including the movements of the tone arm comprises a cam disc 30 which is mounted for rotation.

The phonograph further includes a trigger mechanism operable to engage the cam disc drive after the termination of the playing of a record. This trigger mechanism may be constructed according to my U.K. Patent No. 801,176 corresponding to U.S. patent application Ser. No. 491,422, if desired in an embodiment of this trigger mechanism as disclosed in my U.K. Patent No. 859,372. This trigger mechanism includes a first lever 40 mounted for swinging movement about a stationary pin 42 against a predetermined friction, and the striker 44 which is mounted for swinging movement as well as for reciprocation in response to engagement between its end and a rotating abutment 46 associated with the turntable spindle. The striker 44 engages a surface portion of reduced area of the lever 40 in the form of a rib 41 in the top surface thereof so as to enable the striker 44 to be swung back in clockwise direction in FIGURE 1 by engagement with the rotating abutment 46 as long as the tone arm stylus follows a sound-groove of a record during playing thereof. When after playing of the record the tone arm is moved inwards at faster speed both trip starter levers are swung faster inwards, whereby the abutment 46 will engage the end of the striker lever 44 and reciprocate the lever.

The cam disc drive is derived from the phonograph motor spindle and comprises an elongated rotatable shaft

60 which extends between the motor shaft and the cam disc. Reduction gear means is provided to drive the shaft 60 from the motor spindle as well as to drive the cam disc from the shaft when driven from the motor spindle, and means is provided to engage the cam disc drive after playing of a record and to disengage the spindle drive when the cycle is completed.

More specifically, a worm gear drive is provided between the motor spindle and the shaft 60 comprising a worm 62 which may be constructed as an integral part of the stepped pulley 18 and a worm gear wheel 64 on the elongated shaft 60.

At the other end of the shaft 60 the reduction gear means comprises a worm 66 on the elongated shaft 60 in engagement with a worm gear wheel 68 which may be constructed as an integral part of the cam disc 30.

The elongated shaft 60 is at the end adjacent the phonograph motor spindle rotatably supported in a bearing in a flap 70 of a lever 72, which is pivotally supported at 74.

As will be obvious from the foregoing description and the drawing, a pivoting of the lever 72 in clockwise direction will result in disengagement of the worm drive 62, 64, while pivoting of the lever 72 in counter-clockwise direction will cause engagement of the worm drive 62, 64 at the motor.

The pivoting of the lever 72 to cause engagement and dis-engagement of the worm drive 62, 64 is controlled by cam action, and more specifically by means of a pin 48 which is mounted for reciprocation and guided in a slot (not shown) in the chassis plate 10 and a slot 38 in the lever 72.

In order to pivot the lever 72 to cause engagement of the worm drive 62, 64 in response to termination of playing of a record the pin 48 is mounted on a lever 50 which is pivotable about a pin 52 and is influenced by a snap action spring 54, so that the lever 50 always will assume one of two possible exterior positions limited by suitable abutments, such as edges of an aperture 56 in the chassis plate down through which a flap on the end of the lever 50 extends.

The pin-and-slot connection 48, 38 is so designed that clockwise pivoting of the lever 50 causes counter-clockwise pivoting of the lever 72 to engage the worm drive 62, 64 while counter-clockwise pivoting of the lever 50 causes clockwise pivoting of the lever 72 to disengage the worm drive.

The clockwise pivoting of the lever 50 to cause the engagement of the worm drive 62, 64 in response to the termination of the playing of a record supported on the turntable is caused by reciprocation of the striker lever 44 which is part of the trigger mechanism in response to engagement with a projecting abutment or nose 46 on the turntable bushing 14.

The striker lever 44 is pivotally mounted on the lever 50, for example on the top end of the pin 48.

The end of the elongated shaft 60 adjacent the cam disc drive 66, 68 is supported in a bearing in a flap 76 which extends below the chassis. To provide for sufficient movement of the elongated shaft 60 to allow engagement and disengagement of the worm drive 62, 64, the bearing in the flap 76 may be constructed with a sufficient play, or the flap 76 may be pivotally supported.

In order to provide for counter-clockwise pivoting of the lever 50 to cause the disengagement of the worm drive 62, 64, the structure is designed in such a manner that with the lever 50 pivoted clockwise to engage the worm drive 62, 64, the pin 48 is positioned sufficiently near the periphery of the cam disc 30 to be engaged by a sidewardly extending cam 32 at the periphery of the cam disc. Suitable means may be provided to define the exact position of the cam disc after disengagement of the worm gear 62, 64 with such a position of the cam 32 that controls the disengagement that it will not obstruct the reciprocation of the pin 48 in response to the operation of the striker 44 to cause the engagement of the drive. By way of example, the elongated shaft 60 may be supported in the bearing of the flap 76 with a slight play in axial direction under influence of a spring which surrounds a part of the shaft 60 and is tensioned in response to the rotation of the shaft 60 due to the counter-action of the worm 66. It will be obvious that when the gear is released, the spring will cause a reciprocation of the shaft 60 as provided for by the play of the bearing in the flap 76, sufficient to rotate the cam disc an angle governed by the axial play.

The worm 66 may be of the self-braking type, whereby a well-defined position of the cam disc upon disengagement of the drive 62, 64 is obtained.

If desired, it will also be possible to define the position of the cam disc upon disengagement of the gear 62, 64 by means of a roller which engages a recess in the cam disc.

As will be obvious from the foregoing description, the cam disc drive operates in the manner that with the drive 62, 64 disengaged the lever 50 is pivoted counter-clockwise and the lever 72 is pivoted clockwise.

When after playing of a record the trip starter striker lever 44 is reciprocated, the lever 50 is pivoted clockwise, and thereby the lever 72 is pivoted counter-clockwise to engage the drive 62, 64 and thereby start the rotation of the cam disc 30.

Upon completion of the change cycle the abutment 32 comes into engagement with the pin 48 and pivots the lever 50 counter-clockwise, whereby the lever 72 is pivoted clockwise, so as to disengage the drive 62, 64.

It will be obvious from the foregoing description that the cam disc drive is a simple structure which provides for constant change cycle time. The drive only requires the lever 72, the elongated shaft 60, and the bearing 76, all of which are simple parts. The lever 72 is a substantially flat lever which can be produced by stamping operations. The shaft 60 is just a straight piece of relatively thin steel, such as ⅛ inch piano wire, and the worm wheel 64 as well as the worm 66 are simple parts which can be mass-produced according to any well known production methods insofar as none of the parts require precision engineering.

As already mentioned, the worm 62 may be produced as an integral part with the stepped idler gear 18, and the gear wheel 68 may be an integral part of the cam disc 30.

Since no precision engineering is required, the worms 62 and 66 may even be constructed by a helical wire with a few turns in spaced relationship clamped on the motor shaft and the shaft 60 by its own tension, or secured on the shafts by means of a suitable bonding material.

In comparison with a cam disc drive derived from the turntable which does not provide for constant change cycle time, and which requires an extra idler gear wheel and movable supporting means therefor, the structure described in the foregoing is believed to be competitive with respect to costs, and it will be obvious that the present structure is much simpler and cheaper than cam disc drives for constant change cycle time as previously used in commercially available record changers which have required more complex reduction gears and idlers.

The tone arm 17 is supported on a stationary post 22′ and is mounted for playing movement as well as for movement in vertical direction. The tone arm assembly includes two arms 24′ and 26′ of which the arm 24′ is firmly connected with the tone arm spindle so as to swing with the tone arm and operate as an actuator arm for the trigger mechanism. The arm 26′ is a cam track follower arm having adjacent its end a cam follower to be guided in tracks in the surface of the cam disc whereby the horizontal swinging movements of the tone arm are controlled.

The phonograph may be designed to play records of different sizes and include any convenient means for gauging the size of the next record to be played. By way of example, the tone arm may be used for gauging the size of the next record according to a feeler scheme subject to my U.K. Patent No. 757,379 including any modifications of the cam disc arrangement as disclosed in my U.K. Patents Nos. 852,061 and 859,371, the disclosures of which are hereby made part of the disclosure of this application. The track arrangement which controls the swinging movements of the tone arm will, therefore, only be referred to in very brief general terms. As disclosed in the two British Patents 852,061 and 859,371, in the surface of the cam disc a playing recess is provided which extends to adjacent the periphery of the cam disc and has an outlet in the form of a track which continues into an inwardly leading track—the feeler track. A landing track arrangement extends into the playing recess, and a stop control track 68 extends parallel with the periphery of the cam disc and merges into the playing recess for controlling automatic start of the phonograph in the manner disclosed and claimed in my U.K. Patent No. 852,061 referred to hereinabove.

The raising and lowering of the tone arm is controlled by means of a reciprocable pin mounted within the hollow tone arm spindle in a manner well known to those skilled in the art which therefore will not be described in details.

In the embodiment illustrated in FIGURE 2 the shaft 60 is mounted for reciprocation in axial direction in a bearing 20 at the motor end and at the other end in a rotatable bearing 22 in a relatively stationary flap 76. The rotatable bearing 22 is provided with a worm 66 for driving a worm wheel 68 associated with the cam disc 30.

The shaft 60 extends wholly or partly through the rotatable bearing 22 and is provided with a bushing 24, the end of which is flattened or otherwise shaped to enable sliding engagement with a correspondingly shaped end of the bearing 22, so as to rotate the bearing 22 in response to the rotation of the shaft and the bushing 24, which is rigidly secured to the shaft.

As will be obvious from the foregoing, reciprocation of the shaft structure 60, 24 in the left hand direction will cause disengagement of the gear wheel 64 from the worm 62, while reciprocation in the other direction will cause engagement of the gear.

In order to control the engagement and disengagement of the gear 64, 62 the shaft structure is provided with a washer 26 which from both sides is engaged by a dog 28 which is provided in a lever 36 pivotally supported at 52. The pivoting of the lever 36 is limited by means of an abutment shown at the right hand end of the lever, and the two exterior positions are shown in full lines and dotted lines, respectively.

A second lever 50 is pivotally supported on the pivot 52 of the lever 36 and is capable of pivoting between the positions shown in full lines and in dotted lines, respectively, the pivoting being limited by the ends of an aperture 56 in the base plate.

The striker lever 44 of the trigger mechanism for starting the rotation of the cam disc is pivotable on the lever 50 at 38 and capable of being engaged by the abutment 46 on the turntable bushing so as to thereby reciprocate the lever 44.

The levers 36 and 50 are connected by means of a hairpin-like spring 40′ which effectively provides for snap action movement, so that when the lever 50 is pivoted clockwise from the position shown in dotted lines to the position shown in full lines, the lever 36 will be pivoted counter-clockwise also from the position shown in dotted lines to the position shown in full lines.

As will be obvious from the foregoing, the pivoting of the lever 36 causes the axial reciprocation of the shaft 60 and thereby the engagement or disengagement of the gear 64, 62.

The position shown in the drawing in full lines is the engagement position which results from the reciprocation of the trigger lever 44 by engagement with the striker 46.

The lever 50 is provided with a flap 51 to be operatively engaged by a pin 39 on the cam disc at the end of the change cycle, whereby the lever 50 is pivoted to the position shown in dotted lines and simultaneously this results in snap action pivoting of the lever 36 due to the operation of the spring 40' also to the position shown in dotted lines, which results in disengagement of the gear 64, 62.

The structure illustrated is simple and safe in operation and provides also for using light-weight components for the trip mechanism without liability to distortion, because as will be apparent from the drawing, the switch-on movement of the gear is in response to clockwise pivoting of the lever 50 which, at least to some extent, will also cause clockwise pivoting of the lever 44, so that the tip of this lever is moved completely out of the path of the striker 46.

As will be apparent the invention is not limited to the embodiment illustrated and it will be understood that it will be possible to modify the structure so as for example to use the lever system 36, 50 of FIGURE 2 in combination with a pivotable lever for swinging the shaft 60 in the same manner as shown in FIGURE 1 instead of reciprocating the shaft in order to disengage it.

I claim:

1. A cycle controlled phonograph having a turntable, a driving motor adapted to drive the turntable at a plurality of selectable speeds, a tone arm adapted to carry stylus means, cycle control means operable to move said tone arm between a termination-of-play position and a start-of-play position, including a rotatable cam member, an elongated shaft, first worm drive means at one end of said shaft operatively connecting said shaft and said cam member, second worm drive means at the other end of said shaft operatively connecting said shaft and said driving motor for driving said cam member from said driving motor through said elongated shaft independently of the driving connection between said driving motor and the turntable, means operable to engage said second worm drive means after playing of a record, and means operable to disengage said second worm drive means at the start-of-play of a record.

2. A cycle controlled phonograph having a turntable, a driving motor adapted to drive the turntable at a plurality of selectable speeds, a tone arm adapted to carry stylus means, cycle control means operable to move said tone arm between a termination-of-play position and a start-of-play position, including a rotatable cam member, an elongated shaft, first worm drive means at one end of said shaft operatively connecting said shaft and said cam member, second worm drive means at the other end of said shaft operatively connecting said shaft and said driving motor for driving said cam member from said driving motor through said elongated shaft independently of the driving connection between said driving motor and the turntable, a trigger mechanism operable after termination of the playing of a record, means operable to engage said second worm drive means in response to operation of said trigger mechanism, and means operable to disengage said second worm drive means at the start-of-play of a record.

3. A cycle controlled phonograph having a turntable, a driving motor adapted to drive the turntable at a plurality of selectable speeds, a tone arm adapted to carry stylus means, cycle control means operable to move said tone arm through a cycle between a termination-of-play position and a start-of-play position, including a rotatable cam member, an elongated shaft, first worm drive means at one end of said shaft operatively connecting said shaft and said cam member, second worm drive means at the other end of said shaft operatively connecting said shaft and said driving motor for driving said cam member from said driving motor through said elongated shaft, a trigger mechanism operable after termination of the playing of a record, means operable to engage said second worm drive means in response to the operation of said trigger mechanism, and means on said cam member operable to disengage said second worm drive means at the termination of the tone arm cycle.

4. A cycle controlled phonograph having a turntable, a driving motor adapted to drive the turntable at a plurality of selectable speeds, a tone arm adapted to carry stylus means, cycle control means operable to move said tone arm through a cycle between a termination-of-play position and a start-of-play position, including a rotatable cam member, an elongated shaft, first worm drive means at one end of said shaft operatively connecting said shaft and said cam member, second worm drive means at the other end of said shaft operatively connecting said shaft and said driving motor for driving said cam member from said driving motor through said elongated shaft to take said tone arm through its cycle, a trigger mechanism having a reciprocable lever operable to be reciprocated after termination of the playing of a record, means operatively connecting said reciprocable trigger lever with said elongated shaft and operable to engage said second worm drive means in response to the reciprocation of said lever after playing of a record, disengagement control means on said cam member and means operatively connecting said disengagement control means with said trigger mechanism operable to disengage said second worm drive means and simultaneously condition said trigger mechanism for operation at the end of the tone arm cycle.

5. A cycle controlled phonograph having a turntable, a driving motor adapted to drive the turntable at a plurality of selectable speeds, a tone arm adapted to carry stylus means, cycle control means operable to move said tone arm through a cycle between a termination-of-play position and a start-of-play position, including a rotatable cam member, an elongated shaft, first worm drive means at one end of said shaft operatively connecting said shaft with said cam member, second worm drive means at the other end of said shaft operatively connecting said shaft with said driving motor for driving said cam member from said driving motor through said elongated shaft to take said tone arm through its cycle, a trigger mechanism having a reciprocable lever operable to be reciprocated after the termination of playing of a record, a snap action lever movable between a first position and a second position, means supporting said reciprocable trigger lever on said snap action lever to move said snap action lever from said first to said second position in response to the reciprocation of said reciprocable lever, means operatively connecting said snap action lever with said elongated shaft and operable to engage said second worm drive means in response to the movement of said snap action lever into said second position, and means on said cam member operable to redisplace said snap action lever from said second position back to said first position to reset said reciprocable trigger lever into position conditioned for operation and simultaneously disengage said second worm drive means at the end of said tone arm cycle.

6. A cycle controlled phonograph having a turntable, a driving motor adapted to drive the turntable at a plurality of selectable speeds, a tone arm adapted to carry stylus means, cycle control means operable to move said tone arm through a cycle between a termination-of-play position and a start-of-play position, including a rotatable cam member, an elongated shaft, first worm drive means at one end of said shaft operatively connecting said shaft with said cam member, second worm drive means at the other end of said shaft operatively connecting said shaft with said driving motor for driving said cam member from said driving motor through said elongated shaft to take said tone arm through its cycle, a trigger mechanism having a reciprocable lever operable to be reciprocated after the termination of playing of a record, a snap action lever movable between a first position and a second position, means supporting said reciprocable trigger lever on said snap action lever to move said snap action lever from said first to said second position in response to the reciprocation of said reciprocable lever, a control lever mounted for swinging movement between a first position and a second position, means operatively connecting said control lever with said elongated shaft to render said second worm drive means disengaged in said first position of said control lever and engaged in said second position of said control lever, means operatively connecting said snap action lever with said control lever to move said control lever from its first into its second position when said snap action lever is moved from its first into its second position and vice versa, and means on said cam member operable to redisplace said snap action lever from said second position back to said first position to reset said reciprocable trigger lever into position and conditioned for operation and simultaneously disengage said second worm drive means at the end of said tone arm cycle.

7. A cycle controlled phonograph having a turntable, a driving motor adapted to drive the turntable at a plurality of selectable speeds, a tone arm adapted to carry stylus means, cycle control means operable to move said tone arm through a cycle between a termination-of-play position and a start-of-play position, including a rotatable cam member, an elongated shaft, first worm drive means at one end of said shaft operatively connecting said shaft with said cam member, second worm drive means at the other end of said shaft operatively connecting said shaft with said driving motor for driving said cam member from said driving motor through said elongated shaft to take said tone arm through its cycle, a trigger mechanism having a reciprocable lever operable to be reciprocated after the termination of playing of a record, a snap action lever movable between a first position and a second position, means supporting said reciprocable trigger lever on said snap action lever to move said snap action lever from said first to said second position in response to the reciprocation of said reciprocable lever, a control lever mounted for swinging movement between a first position and a second position, means operatively connecting said control lever with said elongated shaft to render said second worm drive means disengaged in said first position of said control lever and engaged in said second position of said control lever, a lost motion snap action linkage connecting said snap action lever with said control lever to move said control lever from its first into its second position when said snap action lever is moved form its first into its second position and vice versa, and means on said cam member operable to redisplace said snap action lever from said second position back to said first position to reset said reciprocable trigger lever into position conditioned for operation and simultaneously disengage said second worm drive means at the end of said tone arm cycle.

8. A cycle controlled phonograph having a turntable, a driving motor adapted to drive the turntable at a plurality of selectable speeds, a tone arm adapted to carry stylus means, cycle control means operable to move said tone arm through a cycle between a termination-of-play position and a start-of-play position, including a rotatable cam member, an elongated shaft, first worm drive means at one end of said shaft operatively connecting said shaft with said cam member, second worm drive mean at the other end of said shaft operatively connecting said shaft with said driving motor for driving said cam member from said driving motor through said elongated shaft to take said tone arm through its cycle, a trigger mechanism having a reciprocable lever operable to be reciprocated after the termination of playing of a record, a snap action lever movable between a first position and a second position, means supporting said reciprocable trigger lever on said snap action lever to move said snap action lever from said first to said second position in response to the reciprocation of said reciprocable lever, a control lever mounted for swinging movement between a first position and a second position, means operatively connecting said control lever with said elongated shaft to render said second worm drive means disengaged in said first position of said control lever and engaged in said second position of said control lever, a pin-and-slot connection operatively connecting said snap action lever with said control lever to move said control lever from its first into its second position when said snap action lever is moved from its first into its second position and vice versa, and means on said cam member operable to redisplace said snap action lever from said second position back to said first position to reset said reciprocable trigger lever into position conditioned for operation and simultaneously disengage said second worm drive means at the end of said tone arm cycle.

9. A cycle controlled phonograph having a turntable, a driving motor adapted to drive the turntable at a plurality of selectable speeds, a tone arm adapted to carry stylus means, cycle control means operable to move said tone arm between a termination-of-play position and a start-of-play position, including a rotatable cam member, an elongated shaft, first worm drive means at one end of said shaft operatively connecting said shaft and said cam member, second worm drive means at the other end of said shaft and at said driving motor for driving said cam member from said driving motor through said elongated shaft to take said tone arm through its cycle, a trigger mechanism having a reciprocable lever operable to be reciprocated after the termination of playing of a record, a snap action lever movable between a first position and a second position, means supporting said reciprocable trigger lever on said snap action lever to move said snap action lever from said first to said second position in response to the reciprocation of said reciprocable lever, means operatively connecting said snap action lever with said elongated shaft to swing said elongated shaft substantially about the point of engagement of said first worm drive means and being operable to engage said second worm drive means in response to the movement of said snap action lever into said second position, and means on said cam member operable to redisplace said snap action lever from said second position back to said first position to reset said reciprocable trigger lever into position conditioned for operation and simultaneously disengage said second worm drive means at the end of said tone arm cycle.

10. A cycle controlled phonograph having a turntable, a driving motor adapted to drive the turntable at a plurality of selectable speeds, a tone arm adapted to carry stylus means, cycle control means operable to move said tone arm between a termination-of-play position and a start-of-play position, including a rotatable cam member, an elongated, rotatable shaft having a non-reciprocable portion, a reciprocable portion and means operatively connecting said shaft portions to rotate together, first worm drive means at one end of said non-reciprocable shaft portion operatively connecting said shaft with said cam member, second worm drive means at the other end of said reciprocable shaft portion operatively connecting said shaft with said driving motor for driving said cam member from said driving motor through said elongated shaft to take said tone arm through its cycle, a trigger mechanism having a reciprocable lever operable to be reciprocated after the termination of playing of a record, a snap action lever movable between a first position and a second position, means supporting said reciprocable trigger lever on said snap action lever to move said snap action lever from said first to said second position in response to the reciprocation of said reciprocable lever, means operatively connecting said snap action lever with said reciprocable portion of said shaft and operable to reciprocate said portion in response to the movement of said snap action lever into said second position, and means on said cam member operable to redisplace said snap action lever from said second position back to said first position to reset said reciprocable trigger lever into position conditioned for operation and simultaneously disengage said second worm drive means at the end of said tone arm cycle.

11. A cycle controlled phonograph having a turntable, a driving motor adapted to drive the turntable at a plurality of selectable speeds, a tone arm adapted to carry stylus means, cycle control means operable to move said tone arm between a termination-of-play position and a start-of-play position, including a rotatable cam member, an elongated shaft, first worm drive means at one end of said shaft operatively connecting said shaft with said cam member, second worm drive means at the other end of said shaft operatively connecting said shaft with said driving motor for driving said cam member from said driving motor through said elongated shaft, a lever mounted for swinging movement having a bearing for said shaft, a snap action lever operatively connected with said swingingly mounted lever to swing the latter and thereby said shaft to engage and disengage said second worm drive means in response to movement of said snap action lever in either direction, trigger means operable to move said snap action lever in one direction to engage said second worm drive means after playing of a record, and cam means on said cam member operable to move said snap action lever in the opposite direction to disengage said second worm drive means at the start-of-play of a record.

12. A cycle controlled phonograph having a turntable, a driving motor adapted to drive the turntable at a plurality of selectable speeds, a tone arm adapted to carry stylus means, cycle control means operable to move said tone arm between a termination-of-play position and a start-of-play position, including a rotatable cam member, an elongated shaft, first worm drive means at one end of said shaft operatively connecting said shaft with said cam member, second worm drive means at the other end of said shaft operatively connecting said shaft with said driving motor for driving said cam member from said driving motor through said elongated shaft, trigger means operable after playing of a record, first snap action lever means operatively connected with said trigger means and operable to be thrown over in one direction in response to the operation of said trigger means, second snap action lever means operatively connected with said first snap action lever means and with said shaft and operable to be thrown over to engage said second worm drive in response to the throwing over of said first snap action lever means by said trigger means and means on said cam member operable to throw said first snap action lever means over in the opposite direction at the start-of-play of a record whereby said second snap action lever is thrown over and said second worm drive disengaged.

References Cited by the Examiner

UNITED STATES PATENTS

| | | | |
|---|---|---|---|
| 2,339,981 | 1/1944 | Cranmer et al. | 274—10 |
| 2,743,109 | 4/1956 | Mullaney | 274—10 |
| 2,972,482 | 2/1961 | Hugel | 274—10 |
| 3,179,419 | 4/1965 | Churchill | 274—10 |

FOREIGN PATENTS

| | | |
|---|---|---|
| 887,707 | 8/1953 | Germany. |
| 859,372 | 1/1961 | Great Britain. |

NORTON ANSHER, *Primary Examiner.*

J. F. PETERS, *Assistant Examiner.*